United States Patent
Kim

(10) Patent No.: US 7,429,720 B2
(45) Date of Patent: Sep. 30, 2008

(54) ELECTRIC HEATING PIPE AND ELECTRIC HEATING APPARATUS USING IT

(76) Inventor: Hyung-Gon Kim, 839-11 Whajung 3-Dong, Seo-Gu, Gwangju 502-243 (KR)

(*) Notice: Subject to any disclaimer, the term of this patent is extended or adjusted under 35 U.S.C. 154(b) by 395 days.

(21) Appl. No.: 10/541,578

(22) PCT Filed: Jan. 12, 2004

(86) PCT No.: PCT/KR2004/000040

§ 371 (c)(1),
(2), (4) Date: Jul. 6, 2005

(87) PCT Pub. No.: WO2004/063633

PCT Pub. Date: Jul. 29, 2004

(65) Prior Publication Data

US 2006/0083494 A1    Apr. 20, 2006

(30) Foreign Application Priority Data

Jan. 11, 2003  (KR) .................. 10-2003-0001853
Apr. 9, 2003  (KR) .................. 20-2003-0010805 U

(51) Int. Cl.
*H05B 3/02*    (2006.01)
*F28D 15/00*    (2006.01)

(52) U.S. Cl. .................. 219/538; 219/552; 219/553; 219/541; 219/444.1; 165/104.11; 165/104.21; 165/104.27; 165/104.28; 165/104.17; 361/694; 361/697; 361/701; 361/717; 361/727

(58) Field of Classification Search .......... 219/548, 219/534, 540, 538, 544, 552–3, 541; 392/480, 392/487, 485; 165/104.11–104.12, 104.17, 165/104.23, 104.21, 104.26–104.28, 135, 165/80.3–80.4; 29/890.032, 890.041–890.042, 29/890.05, 890.07; 62/489; 361/694–99, 361/701–12, 717–19, 722, 727; 174/15.2, 174/16.3; 257/706–727
See application file for complete search history.

(56) References Cited

U.S. PATENT DOCUMENTS 3,786,861 A    1/1974    Eggers (Continued)

FOREIGN PATENT DOCUMENTS

KR    2001-0011091    2/2001

(Continued)

*Primary Examiner*—Shawntina Fuqua
(74) *Attorney, Agent, or Firm*—IPLA P.A.; James E. Bame

(57) ABSTRACT

The present invention relates to an electric radiating pipe capable of enhancing a heating efficiency in such a manner that a mixture of a porous operation medium and a volatile operation fluid is filled in a radiation pipe, and a porous operation medium is fast heated based on a viscosity difference, and a densely filled operation fluid is phase-changed to a high temperature vapor or a high temperature liquid based on a heated operation medium. In a radiating pipe that includes a certain shaped pipe body, and a heat wire passing through to the interior of the pipe body wherein both ends of the pipe body are sealed by a plugging cap, there is provided an electric radiating pipe that includes a porous non-flammable operation medium and volatile operation fluid being mixed and being filled into the interior of the pipe body.

9 Claims, 3 Drawing Sheets

U.S. PATENT DOCUMENTS

| | | |
|---|---|---|
| 3,834,457 A | 9/1974 | Madsen |
| 4,351,388 A | 9/1982 | Calhoun et al. |
| 5,201,196 A | 4/1993 | Faghri |
| 6,209,625 B1 | 4/2001 | Guo |

FOREIGN PATENT DOCUMENTS

| | | |
|---|---|---|
| KR | 20-0255152 | 11/2001 |

ELECTRIC HEATING PIPE AND ELECTRIC HEATING APPARATUS USING IT

TECHNICAL FIELD

The present invention relates to an electric radiating pipe capable of radiating heat generated in a heating wire to the outside for thereby achieving a warming operation, and in particular to an electric radiating pipe capable of enhancing a heating efficiency in such a manner that a mixture of a porous operation medium and a volatile operation fluid is filled in a radiation pipe, and a porous operation medium is fast heated based on a viscosity difference, and a densely filled operation fluid is phase-changed to a high temperature vapor or a high temperature liquid based on a heated operation medium. In addition, the present invention relates to an electric radiating instrument such as an electric boiler, an electric mat and an electric radiator capable of saving a consuming power using a radiating pipe and decreasing a heating time.

BACKGROUND ART

Generally, in order to achieve a warming operation using electric power, there are an electric boiler installed in a floor and a portable electric mat for thereby increasing temperature, and a radiator (radiating unit) installed in an upright shape for thereby increasing an indoor temperature.

Heating wires are installed in an electric boiler or an electric mat wherein the heating wires are heated based on a supply of power. It is possible to implement a warming effect using a relatively inexpensive electricity instead of expensive oil and gas.

However, in the conventional electric boiler or electric mat, since the heating wires are arranged in a mat based on a simple method, there are not any additional functions except for a warming function and heat transfer function. In addition, since the heating operation and heat keeping operation of the heating wires are maintained only by the supply of power, the power consumption is largely increased in order to increase temperature and keep the increased temperature for long time.

In order to overcome the above problems, a radiating pipe filled with a solid or liquid operation fluid in which a heating wire is installed instead of an electric heat wire is arranged for thereby heating a regenerative liquid using heat generated in the heating wire and increasing temperature using the heated regenerative liquid.

However, in order to heat a regenerative liquid in the radiating pipe, it takes a relatively long time, and an initial heating efficiency is delayed for a certain time period. Since the entire regenerative liquid is heated, an over power is consumed.

In addition, in the case that a radiator is used, a large heat loss occurs while vapor or hot water are supplied from a vapor boiler or hot water boiler using oil or gas to a certain place. In addition, the radiator is a fixed type, it is impossible to move to a certain place.

In order to overcome the above problems, there are provided a certain shaped radiating pipe and a radiating plate. An electric radiator using electricity as a fuel is developed and used. In the above electric radiator, a regenerative liquid is heated using heat generated in the heating wires. The temperature of the radiator is increased using a heated regenerative liquid for thereby achieving a warming operation.

However, when the temperature is increased to a certain temperature, and the supply of electricity is stopped, the temperature is gradually and advantageously decreased, but the initial heating efficiency is low.

DISCLOSURE OF INVENTION

Accordingly, it is an object of the present invention to provide a radiating pipe filled with an operation medium and an operation fluid capable of increasing a heating efficiency in such a manner that a mixture of a porous operation medium and a volatile liquid is filled in a radiation pipe, and a porous operation medium is fast heated based on a viscosity difference, and a densely filled operation fluid is phase-changed to a high temperature vapor or a high temperature liquid.

It is another object of the present invention to provide an electric heating instrument such as an electric boiler, an electric mat and an electric radiator capable of saving a power consumption and decreasing a heating time using a radiation pipe filled with a mixture of a porous operation medium and an operation fluid.

Many effects in relation with the above objects of the present invention will be easily understood with reference to the accompanying drawings.

To achieve the above objects, in the present invention, a volatile operation fluid is filled into the fine holes of a regenerative operation medium in a fine molecular structure for thereby heating the operation medium and increasing the temperature. The filled volatile operation fluid is heated through the operation medium, so that the phase change to vapor is achieved within a shortest time period for thereby heating the entire portions of the radiating pipe using the heated vapor.

To achieve the above objects, in a radiating pipe that includes a certain shaped pipe body, and a heat wire passing through the interior of the pipe body wherein both ends of the pipe body are sealed by a plugging cap, there is provided an electric radiating pipe comprising a porous inflammable operation medium and volatile operation fluid being mixed and being filled into the interior of the pipe body.

The operation medium has a size of 1.about.3 mm and is formed in a circular shape or an elliptical shape or a polygonal shape and is selected from the group comprising yellow earth grains, charcoal, gravel, zeolite, porous non-flammable cotton, non-woven fabric, and rope.

To achieve the above objects, there is provided an electric mat that includes an adiabatic member installed on the floor, a certain shaped pipe body, a plugging cap sealing both ends of the pipe body, a radiating pipe inserted into the pipe body and having a heat wire capable of generating heat when power is supplied, an electric plate installed in an upper side of the radiating pipe, and a finishing material layer installed in an upper side of the electric plate, there is provided an electric mat comprising a porous non-flammable operation medium and a volatile operation fluid being mixed and inserted into the interior of the radiating pipe.

To achieve the above objects, there is provided an electric radiator that includes a radiating pipe formed of a certain shaped pipe body, a heat wire installed in the radiating pipe and generating heat when power is supplied, and a plurality of radiating plates installed vertically with respect to the radiating pipe and generating heat of the radiating pipe, there is provided an electric radiator, comprising a porous non-flammable operation medium and a volatile operation fluid being mixed and inserted into the interior of the radiating pipe.

To achieve the above objects, in an electric boiler that includes a certain shaped pipe body, a sealing cap capable of sealing both ends of the pipe body, and a heat wire inserted into the pipe body and capable of generating heat when power is supplied, there is provided an electric boiler comprising a porous non-flammable operation medium and a volatile operation fluid being mixed and inserted into the interior of the radiating pipe.

BRIEF DESCRIPTION OF DRAWINGS

The present invention will become better understood with reference to the accompanying drawings which are given only by way of illustration and thus are not limitative of the present invention, wherein.

BEST MODE FOR CARRYING OUT THE INVENTION

The construction, operation and effects of the present invention according to the present invention will be described with reference to the accompanying drawings.

Figure 1:
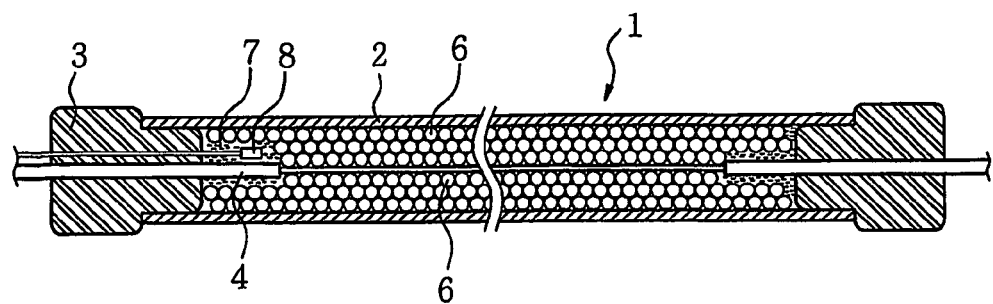
FIG. 1 is a cross sectional view illustrating an electric radiating pipe according to the present invention.
Figure 2:
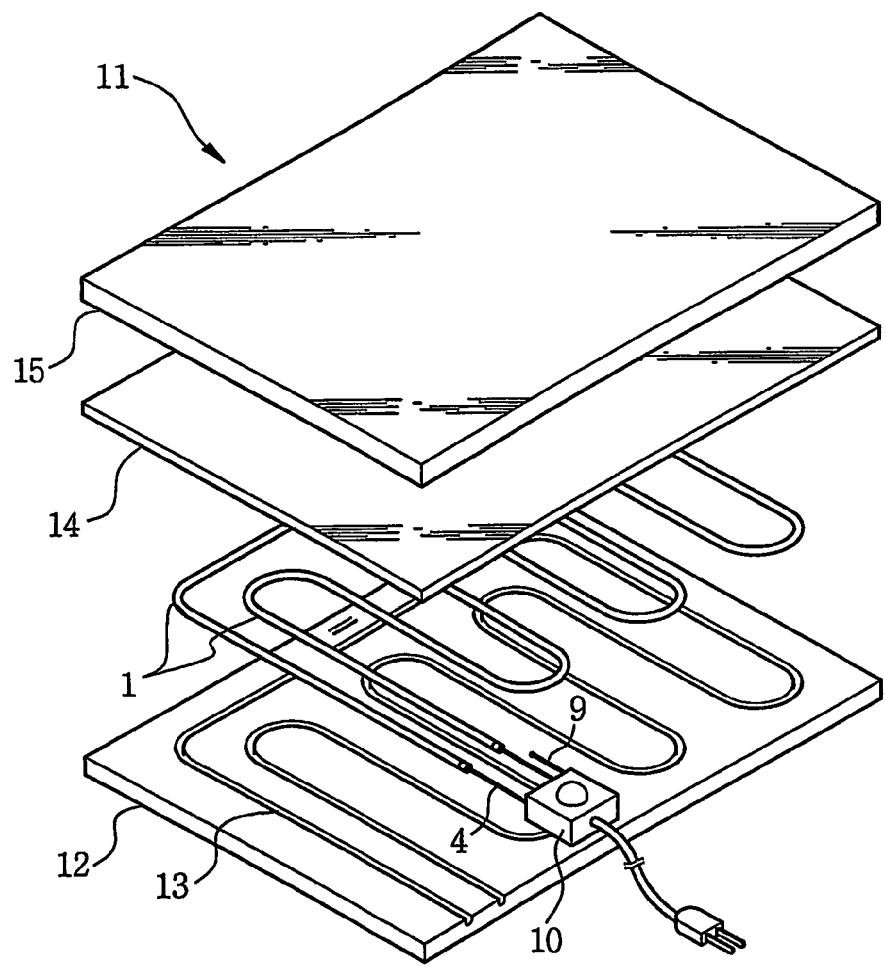
FIG. 2 is a view illustrating an engaged state of an electric mat having an electric radiating pipe according to the present invention.
Figure 3:
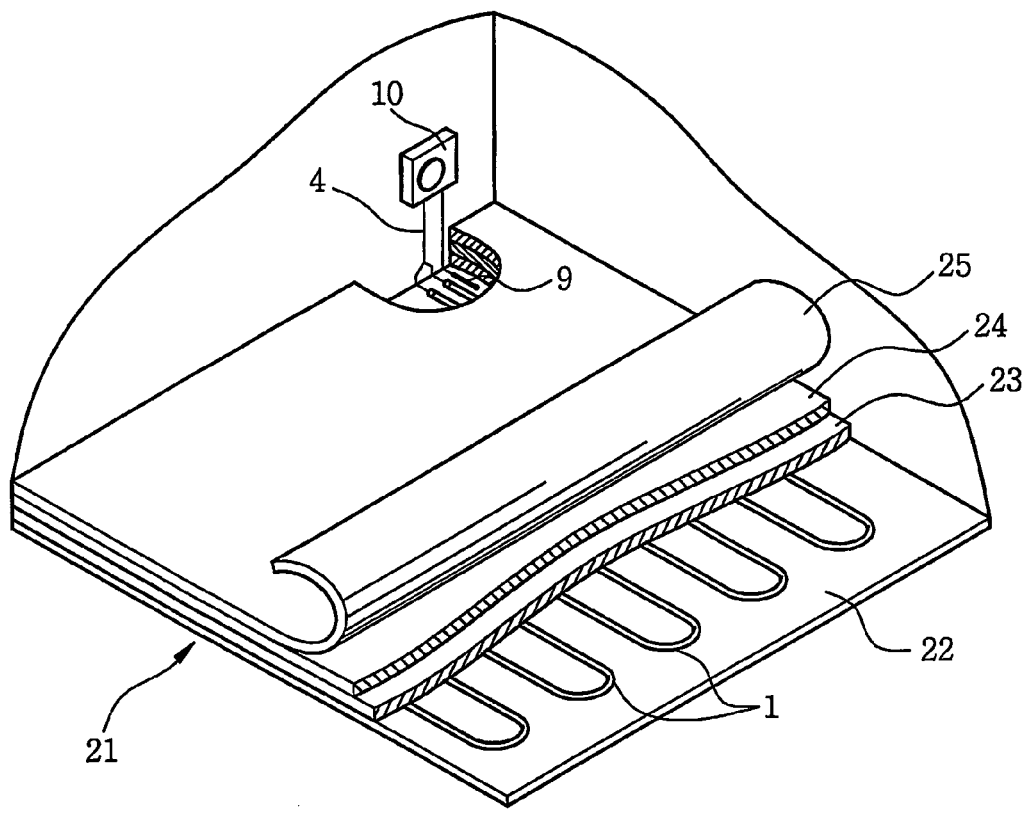
FIG. 3 is a view illustrating an engaged state of an electric boiler having an electric pipe according to the present invention.
Figure 4:
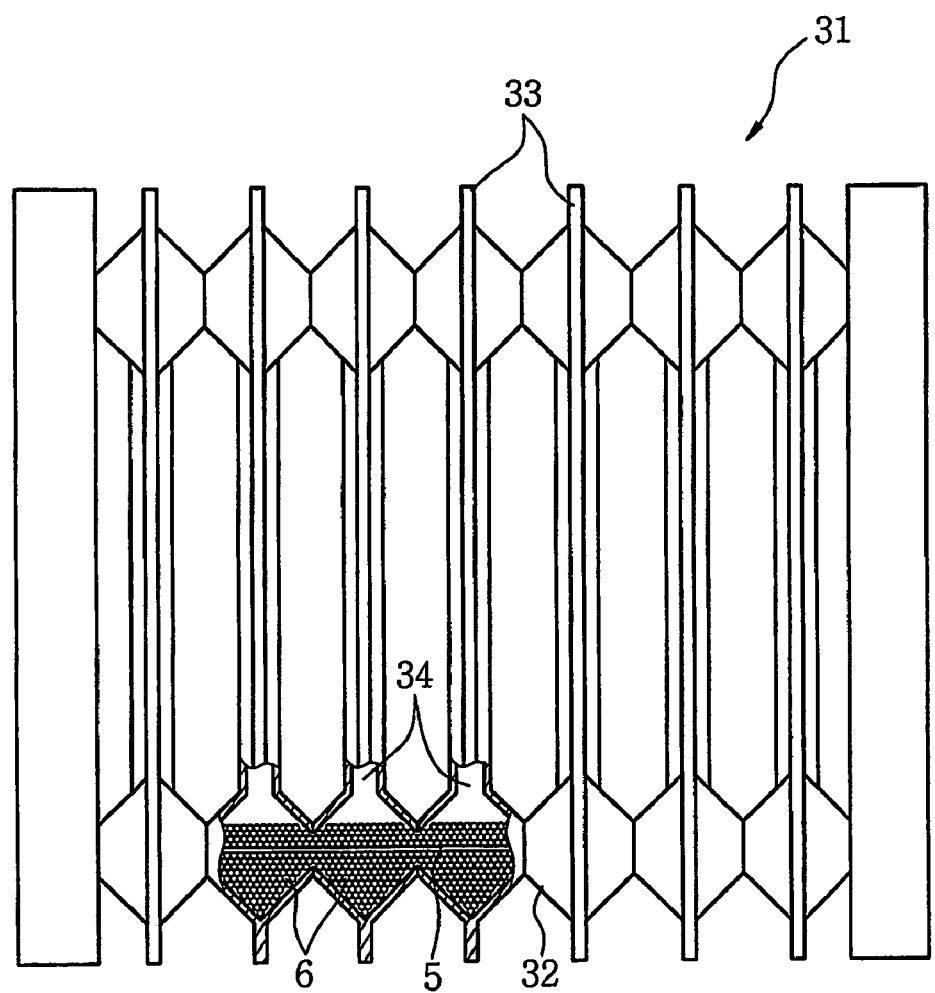
FIG. 4 is a cross sectional view of a major part of an electric radiator having an electric radiating pipe according to the present invention.

FIG. 1 is a cross sectional view illustrating an electric radiating pipe according to the present invention, FIG. 2 is a view illustrating an engaged state of an electric mat having an electric radiating pipe according to the present invention, FIG. 3 is a view illustrating an engaged state of an electric boiler having an electric pipe according to the present invention, and FIG. 4 is a cross sectional view of a major part of an electric radiator having an electric radiating pipe according to the present invention.

As shown in FIG. 1, a radiation pipe according to an embodiment of the present invention includes a pipe body 2 having a certain length, a plugging cap 3 adapted to tightly cap both ends of the pipe body 2, a heat wire 5 accommodated in the interior of the pipe body 2 based on an insulation method and heated by power supplied thereto, and a porous non-flammable operation medium 6 and a volatile operation fluid 7 surrounding the heat wires with an operation fluid 7 therein and being filled into the interior of the pipe body 2. In addition, a bimetal 8 capable of measuring temperature and pressure in the interior of the pipe body 2 is installed.

The pipe body 2 is formed of an excel, PPC, metal plate, etc. capable of enduring a high temperature of over 100° C. and a high pressure and having a heat resistance and a durability and a corrosion resistant property. In particular, the pipe body 2 is formed of a certain material capable of enduring a pressure increased as the operation fluid 7 is changed to a certain gas state.

The plugging cap 3 is formed of a rubber, etc. The plugging cap 3 is fully sealed so that the operation fluid 7 is not leaked even when the operation fluid 7 is heated and changed to gas. At this time, the plugging cap and the pipe body are fully sealed using silicon, etc. The plugging cap 3 includes holes through which the electric cables 4 and the bimetal 8 sealingly pass.

The heat wire 5 is insulated with a triple protection coat such as a silicon coating on a conduction material such as a nichrome wire or copper wire and is installed in the pipe body.

The operation medium is formed of one selected among a grain type material such as yellow earth having moisture and non-flammable and intensive dense holes, charcoal, zeolite, etc. and a non-grain type material such as cotton, non-woven fabric, compression fiber, etc. In particular, the operation medium is preferably filled in the pipe body 2 and is formed of a non-flammable compression fiber covering the heat wire 5.

When the volatile operation fluid 7 is filled in the porous operation medium in molecular state and is heated, a phase change from a liquid state to a gas state is performed. At this time, in the case that the density of the operation medium is significantly increased, the weight of the radiating pipe is increased. In the case that the density of the operation medium is decreased, the time required for the phase change of the volatile operation fluid is extended.

The operation medium 7 is formed of a volatile liquid such as water, salt water, a mixture of water of acetic acid soda. The operation medium 7 may be selectively used based on the volume of holes volume for storing air in the operation medium) of the operation medium. Namely, in the case that the volume of holes is 0, the operation fluid 7 is not impregnated. In the case that the volume of holes is 100%, the operation fluid 7 is fully impregnated into the fibers. When the operation fluid is impregnated below 20% with respect to the volume of holes, it is possible to heat the radiating pipe to the temperature proper for the use of the mat or boiler using a small amount of operation fluid. When the operation fluid is used over 80% with respect to the volume of holes, since the heated operation fluid is not easy to vaporize, more heating time and power consumption are needed.

When power is supplied to the heat wire of the radiating pipe 1, heat is generated in the heat wire 5, and the operation medium 6 and the operation fluid 7 are heated. The operation medium having a fast temperature increase property in a solid state heats its surface and the moisture contained on the surface and the interior of the same. Therefore, the moisture is vaporized or heated to a high temperature liquid, so that the entire radiating pipe 1 is uniformly and fast heated.

Namely, the operation medium 6 is formed heated by heat generated by the heat wire 5, and moisture contained therein is second heated and is changed to hot vapor or high temperature liquid. The vaporized vapor or high temperature liquid is uniformly transferred to the inner cross sectional areas of the radiating pipe 1 as wetting heat and is conducted to the entire portions for thereby achieving uniform radiation. In addition, the heated and vaporized vapor contacts with the inner cross sectional areas of the pipe body and performs a heat exchange and is frozen and condensed as liquid. The condensed water drop is absorbed through the surface of the operation medium 6 based on their gravity and surface tension and is reheated. The water is repeatedly processed through vaporization, condensation and absorption.

The bimetal 8 is installed in the interior of the pipe body 2 through the plugging cap 3. The power supplied to the heat wire 5 is disconnected by measuring temperature and atmospheric pressure of the inner side of the pipe body 2. Namely, the bimetal 8 measures the temperature and pressure (in particular, atmospheric pressure) of the operation medium 7 changed from liquid phase to gas phase, so that the power is automatically disconnected. Therefore, it is possible to prevent the operation fluid 7 affecting the pipe body 2 from affecting the pipe body 2 or the plugging cap 3.

The radiation pipe includes a temperature detector 9 for measuring an outer temperature in the outside of the pipe body 2 for thereby being used as a radiator, and a temperature adjusting unit 10 connected with the bimetal 8 and the temperature detector 9 for thereby controlling the power.

The temperature detector 9 is installed outside the pipe body and is connected with the temperature adjusting unit 10 capable of controlling the temperature of the radiating pipe.

The temperature adjusting unit 10 includes a power plug connected with an external power supply source (not shown), and an electric cable 4 extended to the pipe body 2 and connected with the heat wire 5 through the holes of the plugging cap.

The heating efficiency changed when the operation fluid is mixed with the operation medium at a certain ratio will be described based on the following embodiments of the present invention.

Embodiment 1

In the radiating pipe, a heat wire passes through the interior of the pipe body formed of a material X-L and having a diameter of 15 mm and a height of 1 m. The yellow earth formed of grains of 1~3 mm used as an operation medium (solid) and water used as the operation fluid (liquid) are filled into the pipe body at a certain ratio. In a state that the temperature of the experimental room is maintained at 12~13° C., the operation medium and operation fluid are mixed at different ratio and are heated by the same level of electric power and for the same time period. The temperatures of the operation medium and operation fluid are measured using a digital thermometer at every 1 minute for one hour, and a result of the measurement is shown in the following Table. At this time, the state of solid+fluid represents a state that liquid is added by the amount indicated in the remark of the table in a state that solid is fully filled.

TABLE 1

| Kind | 5 min | 10 | 15 | 20 | 25 | 30 | 35 | 40 | 45 | 50 | 55 | 60 | remark |
|---|---|---|---|---|---|---|---|---|---|---|---|---|---|
| Liquid | 18.9° | 24.6° | 28.2° | 31.5° | 32.4° | 33.7° | 34.3° | 35.7° | 36.7° | 37.5° | 38.4° | 39.5° | Water |
| Solid | 21.3° | 31.2° | 38.4° | 41.8° | 44.9° | 45.4° | 46.2° | 46.5° | 46.8° | 47.2° | 47.8° | 48.5° | Yellow earth grain |
| Solid + liquid | 23.4° | 34.6° | 40.8° | 45.2° | 49.2° | 49.8° | 50.8° | 52° | | 52.4° | 53.2° | 53.6° | 54.2° | Water 10~15 ml |
| Solid + liquid | 20.5° | 32.1° | 39.1° | 44.3° | 48.2° | 49.6° | 51.2° | 52.5° | 53.8° | 54.2° | 55.2° | 56.4° | Water 30~35 ml |
| Solid + liquid | 19.7° | 32° | 38.3° | 45.1° | 49.2° | 49.7° | 52.3° | 53.6° | 54.3° | 55.6° | 56.4° | 57.8° | Water 40~45 ml |

As shown in the above table 1, in the case that only the operation fluid is filled, the temperature of the radiating pipe is more gradually increased as compared to when only the operation fluid is filled. Therefore, it is known that the operation medium has better heating efficiency. In the case that a small amount of the operation fluid is filled into the radiating pipe filled with the operation medium, the heating efficiency is significantly higher as compared to when only the operation medium is filled.

In addition, when the operation fluid is filled by 40~45 ml, it is possible to achieve a state that moisture does not form water drop on the surface of the operation medium. In the case that over operation fluid is filled, the amount of the operation medium gets excessive, so that the moisture forms water drop and flows in the interior of the radiating pipe. The above result was obtained based on a result of the experiment. Here, the amount of the operation fluid is not limited thereto.

Embodiment 2

The pipe body filled with the operation medium (solid) and the operation fluid (liquid) used in the first embodiment of the present invention are heated for one hour, and the supply of the power is disconnected. The dropping of the temperature of the radiating pipe is checked at every 5 minutes, and the temperatures of the radiating pipe under the same condition are shown in the flowing table 2.

As shown in the above table 2, in the case that only the operation fluid is filled, it is known that the speed that the temperature is dropped is slower as compared to when only the operation medium is filled. Therefore, the operation that only the operation fluid is filled is more effective for keeping the heating for a long time as compared to when only the operation medium is filled.

In addition, the operation medium and operation fluid are filled into the radiating pipe at different ratios, and the temperatures are measured. As a result of the measurement, the operation that the operation medium and operation fluid are filled into the radiating pipe by a certain proper amount has a desired heating keeping effect as compared to when only the operation medium is filled.

Therefore, as an analysis of the tables 1 and 2, when the operation medium and operation fluid are filled into the radiating pipe at a certain proper ratio has an enhanced heating efficiency as compared to when either operation medium or operation fluid is filled into the radiating pipe.

However, when the operation medium and the operation fluid are mixed and filled into the radiating pipe, if the operation fluid is mixed with the operation medium by the amount of over 40~45 ml, namely, in a state that the operation fluid does not flow down on the surface of the operation medium, the operation fluid is gathered in the lower side of the radiating pipe. Therefore, the temperature lower than the temperature of the radiating pipe is disadvantageously obtained. Therefore, it is preferred that the operation medium and operation fluid are mixed and filled into the radiating pipe in such a manner that the operation fluid does not flow on the surface of the operation is medium.

TABLE 2

| Kind | 5 min | 10 | 15 | 20 | 25 | 30 | 35 | 40 | 45 | 50 | 55 | 60 | remark |
|---|---|---|---|---|---|---|---|---|---|---|---|---|---|
| Liquid | 35.9° | 29.9° | 25.7° | 23.8° | 22.3° | 20.6° | 20.1° | 18.8° | 18.2° | 17.7° | 17.4° | 17.1° | Water |
| Solid | 44.2° | 33.9° | 27.2° | 24° | 21.3° | 19.8° | 18.6° | 17.5° | 17.2° | 17° | 16.8° | 16.4° | Yellow earth grain |
| Solid + liquid | 49.2° | 37.2° | 30.7° | 26.2° | 24.2° | 21.1° | 19.7° | 18.1° | 17.4° | 17.2° | 17.1° | 16.6° | Water 10~15 ml |
| Solid + liquid | 49.3° | 38.1° | 31.5° | 27.3° | 24.3° | 21.8° | 20.2° | 18.4° | 17.8° | 17.3° | 17.2° | 17° | Water 30~35 ml |
| Solid + liquid | 49.6° | 38.8° | 31.7° | 27.8° | 24.9° | 22.3° | 20.9° | 18.9° | 18.2° | 17.5° | 17.4° | 17.2° | Water 40~45 ml |

Embodiment 3

Five pipe bodies formed of an excel pipe of a diameter of 15 mm and a height of 10 m are arranged in a zigzag shape at a room temperature of 7~8° C. In addition, a nichrome heat wire having 20 W/H for every 1 m is arranged in two rows by a length of 10 m for each turn in the interior of the pipe body. The operation fluid formed of water and acetic acid soda is impregnated into a polyester compressed cotton operating as an operation medium having a volume of 600 cm$^3$ and a weight of 20 g based on a 15 volume % (height of 1.5 m of pipe body of 10 m), 22 volume % (height of 2.2 mm of pipe body of 10 m), and 29 volume % (height of 2.9 mm of pipe body of 10 m), respectively, with respect to the internal volume of the pipe body. A digital thermometer is inserted between the third and fourth radiating pipes. The average temperatures are checked by a few times after 30 minutes, and a result of the measurement is shown in the following table 3.

TABLE 3

| Radiating pipe (amount of operation fluid) | Temperature (° C.) |
| --- | --- |
| Radiating pipe impregnated into 15% | 73~75 |
| Radiating pipe impregnated into 22% | 70~73 |
| Radiating pipe impregnated into 29% | 67~70 |

[Comparison 1]

The same heat wire is inserted into the same pipe body as the pipe body of the embodiment 3 of the present invention. In a state that a non-flammable fiber is not inserted, only the operation fluid is filled 100%, and a digital thermometer is inserted between the third and fourth radiating pipes. The average temperature is measured a few times after 30 minutes."

As a result of the measurement, about 30 minutes after the supply of the power, the temperature is increased to 37~39° C.

As described above in the first and third embodiments of the present invention, the radiating pipe according to the present invention can be heated to a high temperature within a short time period as compared to the conventional radiating pipe filled with a common liquid operation fluid, so that it is possible to decrease the power consumption needed for achieving a desired temperature for the heating operation.

The electric mat according to the present invention will be described with reference to FIG. 2.

As shown therein, in the electric mat 11 of the present invention, an adiabatic member 12 having an adiabatic property such as polyurethane is formed on the floor with a certain thickness, and a hose accommodating part 13 is formed in a zigzag shape on the adiabatic member 12 for installing the radiating pipe 1.

The radiating pipe 1 having the same shape as the hose accommodating part 13 is arranged in the hose accommodating part 13 formed in the adiabatic member 12, and an electric plate 14 is installed in the upper side of the radiating pipe 1. At this time, the electric plate 14 is formed of a metallic plate having an excellent heat conduction property.

The electric mat 11 is finished with the mat layer 15 on the upper side of the electric plate 14.

The temperature detector 9 adapted to detect the temperature is installed outside the radiating pipe 1 or in the electric plate 14, and the temperature detector 9 is connected with the temperature adjusting unit 10 capable of adjusting the radiating degree of the radiating pipe 1.

The electric boiler installed in a Korean under-floor heating room according to another embodiment of the present invention.

As shown therein, in the electric boiler 21, a straight line shaped or curve shaped hose accommodating part (not shown) is installed in a zigzag shape on the floor of the Korean under-floor heating room 22, and the radiating pipe 1 is accommodated based on the type of the hose accommodating part.

Thereafter, the electric plate 23 is installed on the upper side of the radiating pipe 1 for transferring heat generated in the radiating pipe. A decoration material 24 and a finishing material 25 are installed on the upper side of the electric plate 23, so that a Korean under-floor heating room having the electric boiler 21 is finished. At this time, the temperature detector 9 is installed in the electric plate 23 that is provided outside the radiating pipe for thereby detecting the temperature of the electric plate 23.

The temperature adjusting unit 10 is installed in one side of the wall surface and is adapted to adjust the power supplied to the electric cable.

The electric radiator having a radiating pipe according to another embodiment of the present invention will be described with reference to FIG. 4.

In the electric radiator 30 according to the present invention, a heat wire 5 is provided and generates heat when electric power is supplied to the radiating pipe 32 having the same construction as a common conventional radiator. A plurality of radiating plates 33 capable of radiating heat of the radiating pipe 32 are installed vertically with respect to the radiating pipe 32. A circulation path 34 is formed in the radiating plate 33 for circulating a high temperature gas or a high temperature liquid.

In the radiating pipe 1 installed in the electric mat 11 or the electric boiler 21 or the electric radiator 31 as shown in FIGS. 2 through 4, when the power is supplied to the heat wire 5 installed in the pipe body 2 as shown in FIG. 1, the operation medium 6 surrounding the heat is heated and the temperature is increased as the heat wire 5 generates heat. As the temperature of the operation medium is increased, the phase is changed from a liquid state to a gas state. The wetting heat is uniformly spread to the inner cross section areas of the radiating pipe 1, so that a heat radiating is uniformly performed for thereby achieving a desired heating function.

The heated and vaporized vapor performs a heat exchange, while contacting with the inner cross section areas of the pipe body of the radiating pipe 1, and is frozen to a low temperature liquid and is condensed. The condensed water drop is absorbed through the contacting surface of the operation medium based on a gravity operation and surface tension and is reheated. The process of the vaporization, condensation and absorption is repeatedly performed for thereby achieving a heating operation.

As the operation fluid 7 is vaporized, the temperature and pressure of the pipe body 2 are measured by a bimetal 8. In the case that the measured temperature and pressure exceed the set temperature and pressure, the power supplied to the heat wire 5 is automatically disconnected.

As described above, the radiating pipe filled with the operation medium and operation fluid according to the present invention generates as electric power may be well adapted to all kinds of heating instruments capable of generating heat and achieving a heating function as electric power is supplied for thereby enhancing a heating efficiency. The present invention is not limited to the above description. The present invention may be adapted to all instruments using electric power.

In addition, the ratios of the operation fluid with respect to the operation medium filled into the radiating pipe may be variously changed based on the size of the radiating pipe and the moisture absorption ratio of the operation medium. The operations that a proper ratio is set; and the operation fluid is mixed with the operation medium based on the set ration are included within the range of the present invention.

INDUSTRIAL APPLICABILITY

As described above, in the present invention, in the radiating pipe for an electric boiler according to the present invention, the operation medium and the operation fluid are mixed and filled into the radiating pipe at a proper ratio, so that the heat generated in the heat wire fast increases the temperature of the operation medium, and the heat of the operation medium is transferred to the operation fluid. Therefore, the operation fluid is fast vaporized to a high temperature vapor within a short time period, so that the entire portions of the radiating pipe are uniformly heated for thereby enhancing a heating efficiency.

In addition, since the porous operation medium is used, the process that the vaporization or condensation of the operation fluid is easily repeated based on the holes formed in the operation medium.

Furthermore, the amount of the operation fluid is decreased using a porous compressed fiber adapted as the operation medium in the radiating pipe, so that the weight of the electric may is significantly decreased.

The present invention is not limited to the above embodiment. As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A radiating pipe that includes a certain shaped pipe body, and a heat wire passing through the interior of the pipe body wherein both ends of the pipe body are sealed by a plugging cap, an electric radiating pipe, comprising: a porous non-flammable operation medium and volatile operation fluid being mixed and being filled into the interior of the pipe body.

2. The pipe of claim 1, wherein said operation medium has a size of 1.about.3 mm and is formed in a circular shape or an elliptical shape or a polygonal shape.

3. The pipe of claim 2, wherein said operation medium is selected from the group comprising yellow earth grains, charcoal, gravel, and zeolite.

4. The pipe of claim 1, wherein said operation medium is selected from a non-flammable fabric group selected from porous cotton, non-woven fabric, cotton, and rope.

5. The pipe of claim 4, wherein said operation fluid has 20.about.80% air volume ratio with respect to the air volume of the operation medium.

6. An electric mat that includes an adiabatic member installed on the floor, a certain shaped pipe body, a plugging cap sealing both ends of the pipe body, a radiating pipe inserted into the pipe body and having a heat wire capable of generating heat when power is supplied, an electric plate installed in an upper side of the radiating pipe, and a finishing material layer installed in an upper side of the electric plate, an electric mat, comprising: a porous non-flammable operation medium and a volatile operation fluid being mixed and inserted into the interior of the radiating pipe.

7. The mat of claim 6, wherein said operation medium is selected from the group comprising yellow earth grains, charcoal, gravel, zeolite, porous cotton, non-woven fabric, cotton and rope.

8. An electric radiator that includes a radiating pipe formed of a certain shaped pipe body, a heat wire installed in the radiating pipe and generating heat when power is supplied, and a plurality of radiating plates installed vertically with respect to the radiating pipe and generating heat of the radiating pipe, an electric radiator, comprising: a porous non-flammable operation medium and a volatile operation fluid being mixed and inserted into the interior of the radiating pipe.

9. The radiator of claim 8, wherein said operation medium is selected from the group comprising yellow earth grains, charcoal, gravel, zeolite, porous cotton, non-woven fabric, cotton and rope.

* * * * *